US011582751B2

United States Patent
Juneja et al.

(10) Patent No.: US 11,582,751 B2
(45) Date of Patent: Feb. 14, 2023

(54) POWER SAVING BY COMBINING MULTIPLE BANDWIDTH PARTS (BWPS) INTO A SINGLE WIDEBAND CHANNEL

(71) Applicant: QUALCOMM Incorporated, San Diego, CA (US)

(72) Inventors: Raveesh Juneja, Hyderabad (IN); Akash Kumar, Hyderabad (IN); Rimal Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

(21) Appl. No.: 17/208,871

(22) Filed: Mar. 22, 2021

(65) Prior Publication Data

US 2022/0303990 A1  Sep. 22, 2022

(51) Int. Cl.
*H04L 12/28* (2006.01)
*H04W 72/0453* (2023.01)
*H04W 52/02* (2009.01)
*H04J 1/16* (2006.01)

(52) U.S. Cl.
CPC ... *H04W 72/0453* (2013.01); *H04W 52/0209* (2013.01)

(58) Field of Classification Search
CPC . H04B 7/2634; H04L 5/0098; H04W 72/0453
USPC .................. 370/252, 329, 386, 430
See application file for complete search history.

(56) References Cited

U.S. PATENT DOCUMENTS

| 2019/0028087 | A1 | 1/2019 | Zhuo et al. |
| 2020/0107308 | A1 | 4/2020 | Liao et al. |
| 2020/0351738 | A1* | 11/2020 | Huang ............... H04B 17/364 |
| 2021/0058964 | A1* | 2/2021 | Hooli ................ H04L 5/0062 |

OTHER PUBLICATIONS

3GPP TS 38.321: "3rd Generation Partnership Project, Technical Specification Group Radio Access Network, NR, Medium Access Control (MAC) Protocol Specification (Release 16)", 3GPP Standard, Technical Specification, V16.3.0 (Dec. 2020), Dec. 2020, pp. 1-156, Retrieved from the Internet: URL: https://ftp.3gpp.org/Specs/archive/38_series/38.321/38321-g30.zip 38321-g30.docx [retrieved on Jan. 6, 2021].
International Search Report and Written Opinion—PCT/US2022/016028—ISA/EPO—dated May 20, 2022.

(Continued)

*Primary Examiner* — John Pezzlo
(74) *Attorney, Agent, or Firm* — Seyfarth Shaw LLP

(57) ABSTRACT

A method of wireless communications by a user equipment (UE) includes detecting, in response to a bandwidth part (BWP) switch, a first BWP of a first carrier aggregation signal and a second BWP of a second carrier aggregation signal. The first BWP of the first carrier aggregation signal and the second BWP of the second carrier aggregation signal are each within a predetermined frequency range of each other. The method also includes tuning a radio frequency (RF) channel to a center of a wideband channel including the first BWP and the second BWP. The method further includes processing the wideband channel including both the first BWP of the first carrier aggregation signal and the second BWP of the second carrier aggregation signal with a single phase locked loop (PLL).

30 Claims, 9 Drawing Sheets

(56) References Cited

OTHER PUBLICATIONS

LG Electronics: "Further Clarification for Wideband Operation of NR Ue", 3GPP TSG-RAN WG4 #84BIS meeting, 3GPP Draft, R4-1710912, 3rd Generation Partnership Project (3GPP), Dubrovnik, Croatia, Oct. 9-13, 2017, 6 Pages, Retrieved from the Internet: URL: http://www.3gpp.org/ftp/Meetings_3GPP_SYNC/RAN4/Docs/ [retrieved on Oct. 8, 2017].

Mediatek Inc: "Wideband Operation for NR-U", 3GPP TSG RAN WG1 Ad-Hoc Meeting 1901, 3GPP Draft, R1-1900190, 3rd Generation Partnership Project (3GPP), Taipei, Taiwan, Jan. 21-25, 4 Pages, Retrieved from the Internet: URL: http://www.3gpp.org/ftp/Meetings%5F3GPP%5FSYNC/RAN1/Docs/R1%2D1900190%2Ezip [retrieved on Jan. 20, 2019].

* cited by examiner

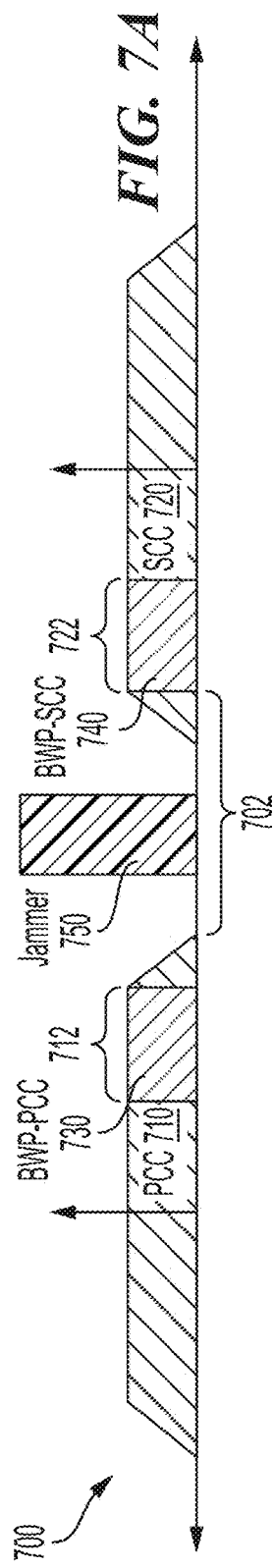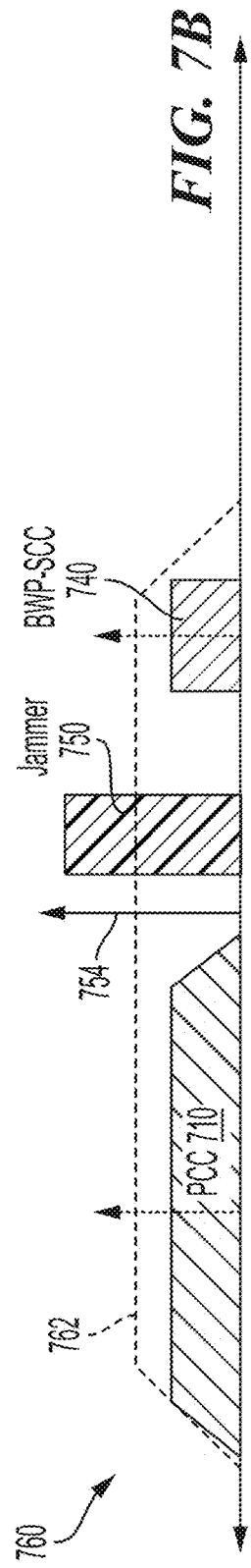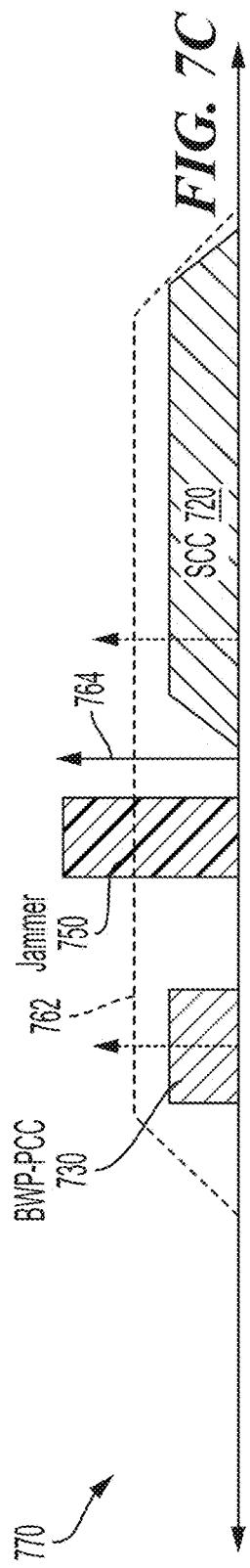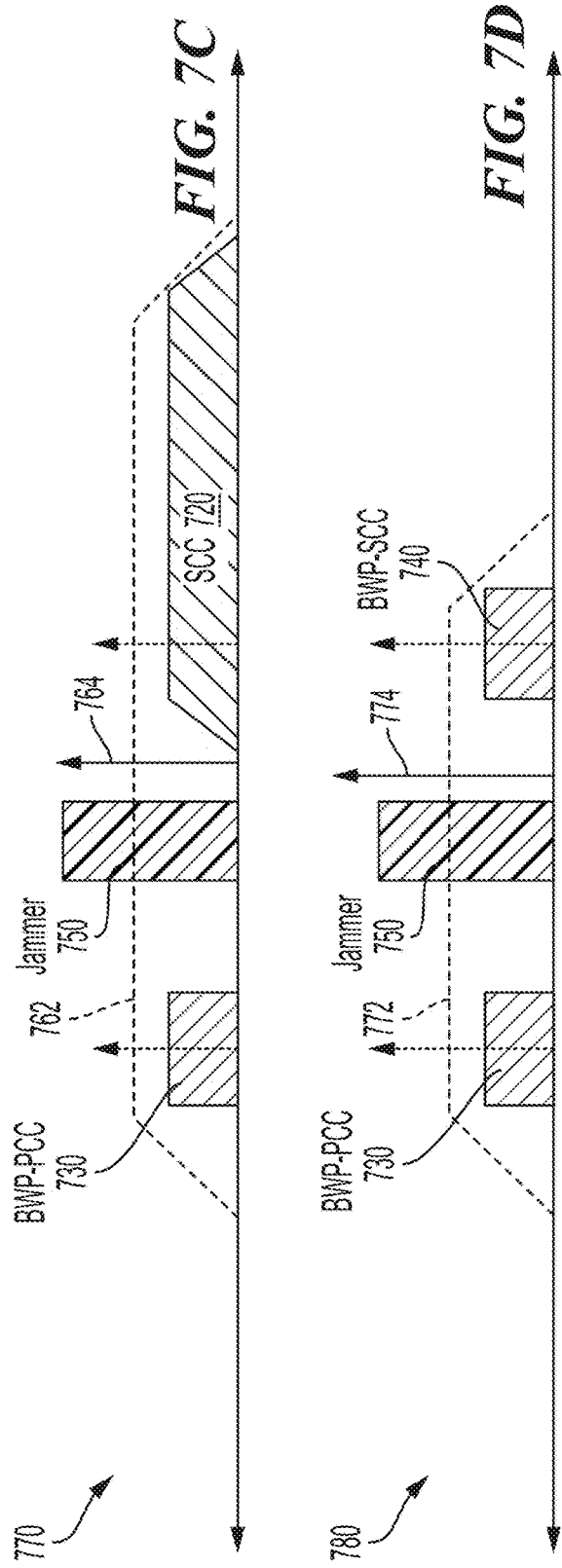

POWER SAVING BY COMBINING MULTIPLE BANDWIDTH PARTS (BWPS) INTO A SINGLE WIDEBAND CHANNEL

FIELD OF THE DISCLOSURE

Aspects of the present disclosure generally relate to wireless communications, and more particularly to techniques and apparatuses for a power saving scheme that combines multiple bandwidth parts into a wideband channel.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

A method of wireless communications by a user equipment (UE) includes detecting, in response to a bandwidth part (BWP) switch, a first BWP of a first carrier aggregation signal and a second BWP of a second carrier aggregation signal. The first BWP of the first carrier aggregation signal and the second BWP of the second carrier aggregation signal are each within a predetermined frequency range of each other. The method also includes tuning a radio frequency (RF) channel to a center of a wideband channel including the first BWP and the second BWP. The method further includes processing the wideband channel including both the first BWP of the first carrier aggregation signal and the second BWP of the second carrier aggregation signal with a single phase locked loop (PLL).

An apparatus for wireless communications by a user equipment (UE) is described. The apparatus includes means for detecting, in response to a bandwidth part (BWP) switch, a first BWP of a first carrier aggregation signal and a second BWP of a second carrier aggregation signal. The first BWP of the first carrier aggregation signal and the second BWP of the second carrier aggregation signal each within a predetermined frequency range of each other. The apparatus also includes means for tuning a radio frequency (RF) channel to a center of a wideband channel including the first BWP and the second BWP. The apparatus further includes means for processing the wideband channel including both the first BWP of the first carrier aggregation signal and the second BWP of the second carrier aggregation signal with a single phase locked loop (PLL).

A user equipment (UE) includes a processor and a memory coupled with the processor. The UE includes instructions stored in the memory. When the instructions are executed by the processor, the UE is operable to detect, in response to a bandwidth part (BWP) switch, a first BWP of a first carrier aggregation signal and a second BWP of a second carrier aggregation signal. The first BWP of the first carrier aggregation signal and the second BWP of the second carrier aggregation signal are each within a predetermined frequency range of each other. The UE is also operable to tune a radio frequency (RF) channel to a center of a wideband channel including the first BWP and the second BWP. The UE is further operable to process the wideband channel including both the first BWP of the first carrier aggregation signal and the second BWP of the second carrier aggregation signal with a single phase locked loop (PLL).

A non-transitory computer-readable medium having program code recorded thereon is executed by a processor. The non-transitory computer-readable medium includes program code to detect, in response to a bandwidth part (BWP) switch, a first BWP of a first carrier aggregation signal and a second BWP of a second carrier aggregation signal. The first BWP of the first carrier aggregation signal and the second BWP of the second carrier aggregation signal are each within a predetermined frequency range of each other. The non-transitory computer-readable medium also includes program code to tune a radio frequency (RF) channel to a center of a wideband channel including the first BWP and the second BWP. The non-transitory computer-readable medium further includes program code to process the wideband channel including both the first BWP of the first carrier aggregation signal and the second BWP of the second carrier aggregation signal with a single phase locked loop (PLL).

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIGS. 7A-7D are signal diagrams illustrating non-contiguous carrier aggregation scenarios in which two carriers may operate within a same band that includes a gap jammer, according to aspects of the present disclosure.

DETAILED DESCRIPTION

Figure 1:
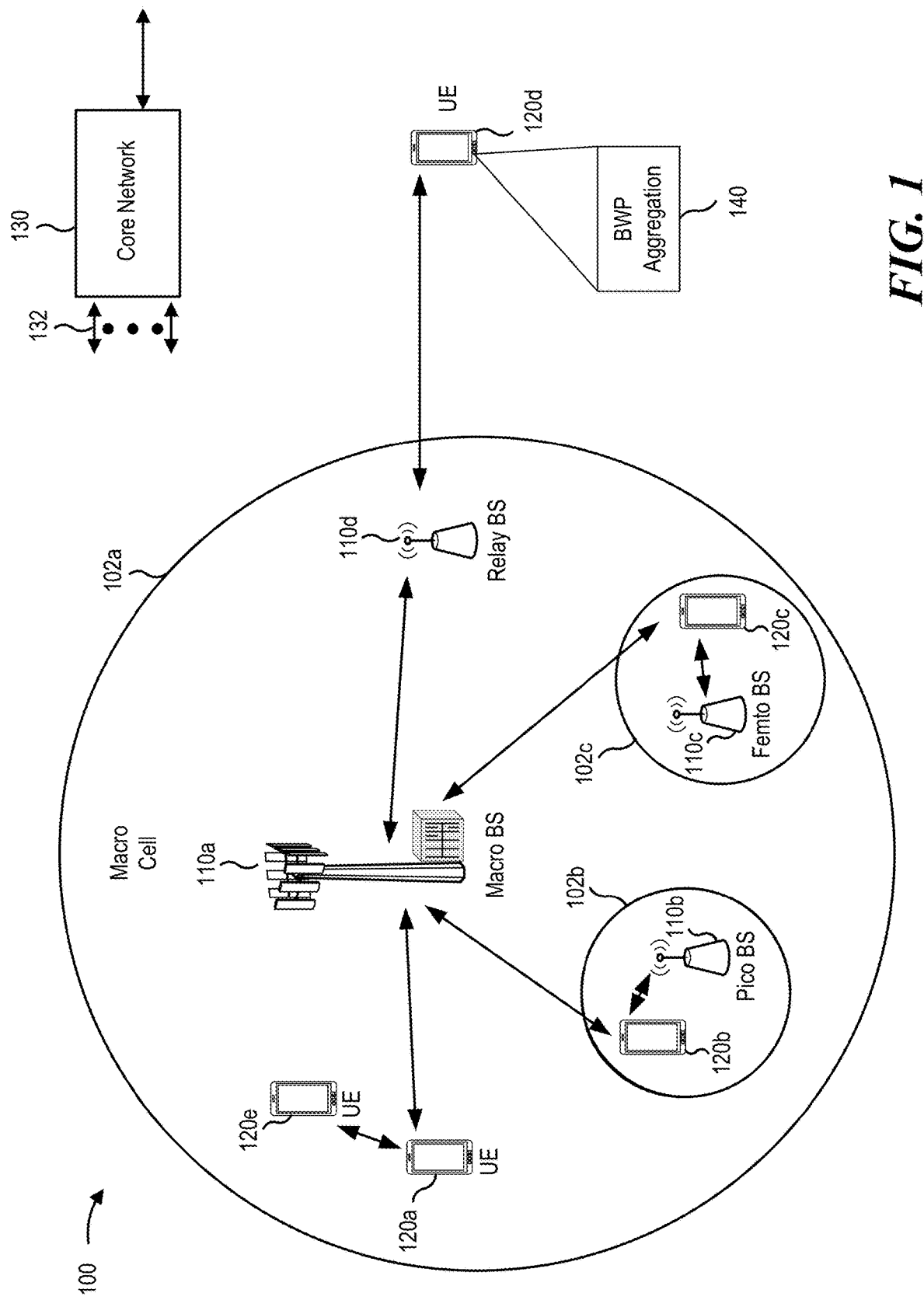
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Advances in technology result in smaller and more powerful computing devices. For example, a variety of portable personal computing devices currently exist, including wireless computing devices, such as portable wireless telephones, user equipments (UE), personal digital assistants (PDAs), and paging devices that are small, lightweight, and easily carried by users. More specifically, portable wireless telephones, such as cellular telephones and Internet protocol (IP) telephones, can communicate voice and data packets over wireless networks.

One goal driving the wireless communication industry is providing consumers with increased bandwidth. The use of carrier aggregation in current generation communications provides one possible solution for achieving this goal. Carrier aggregation enables a wireless carrier to increase bandwidth by simultaneously using multiple frequencies for a single communication stream.

A wireless device (e.g., a cellular phone or a smartphone) in a wireless communication system may transmit and receive data using two-way communication. The wireless device may include a transmitter for transmitting data and a receiver for receiving data. For data transmission, the transmitter may modulate a radio frequency (RF) carrier signal with data to obtain a modulated RF signal, amplify the modulated RF signal to obtain an amplified RF signal having the proper output power level, and transmit the amplified RF signal via an antenna to a base station. For data reception, the receiver may obtain a received RF signal (via the antenna) and may amplify and process the received RF signal to recover data sent by the base station.

A wireless device may support carrier aggregation, which is simultaneously operation on multiple carriers. A carrier may refer to a range of frequencies used for communication and may be associated with certain characteristics. For example, a carrier may be associated with system information describing operation on the carrier. A carrier may also be referred to as a component carrier (CC), a frequency channel, and/or a cell, etc. It is desirable for a wireless device to efficiently support carrier aggregation.

In general, carrier aggregation (CA) may be categorized into two types: intra-band CA and inter-band CA. Intra-band CA refers to operation on multiple carriers within the same band, and inter-band CA refers to operation on multiple carriers in different bands. The carriers may be contiguous or non-contiguous. Non-contiguous carrier aggregation has unique issues due to the separation of frequency bands and potential jammers within a gap between the frequency bands.

Aspects of the present disclosure are directed to a receiver (Rx) portion of a wireless transceiver (WTR) configured to combine bandwidth parts of separate carrier aggregation signals into a wideband channel. The WTR supports a power saving scheme by treating separate carriers operating with a shared low noise amplifier (LNA) according to a continuous carrier aggregation (CCA) scenario. This CCA scenario combines the separate carriers in a wideband channel to enable processing of the wideband channel using components of a single receiver (SRx), such as a single receiver local oscillator (RxLO).

Although a single wideband may be sufficient to carry an aggregated bandwidth of two carriers, a gap between the center frequencies of the two carriers may include potential jammers. As a result, aligning a single RxLO in the middle of the aggregated bandwidth in the SRx scheme may not suffice. In these examples, the gap between the two carriers is sufficient to allow for gap jammers, while the aggregated bandwidth fits within a wideband channel. The wireless device may be configured to identify and cancel gap jammers when operating in an offset zero intermediate frequency (OZIF) mode by using a saturation detection module.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects of the present disclosure, a cell may not necessarily be stationary, and the geographic area of the cell may move according to the location of a mobile BS. In some aspects of the present disclosure, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless communications system 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a bandwidth part (BWP) aggregation module 140. For brevity, only one UE 120d is shown as including the BWP aggregation module 140. The BWP aggregation module 140 may determine. The BWP aggregation module 140 may detect, in response to a bandwidth part (BWP) switch, a first BWP of a first carrier aggregation signal and a second BWP of a second carrier aggregation signal. The first BWP of the first carrier aggregation signal and the second BWP of the second carrier aggregation signal are each within a predetermined frequency range of each other. The BWP aggregation module 140 may also tune a radio frequency (RF) channel to a center of a wideband channel including the first BWP and the second BWP. The BWP aggregation module 140 may also process the wideband channel including both the first BWP of the first carrier aggregation signal and the second BWP of the second carrier aggregation signal with a single phase locked loop (PLL).

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects of the present disclosure, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB)).

As indicated above, FIG. 1 is provided merely as an example. Other examples may differ from what is described with regard to FIG. 1.

Figure 2:
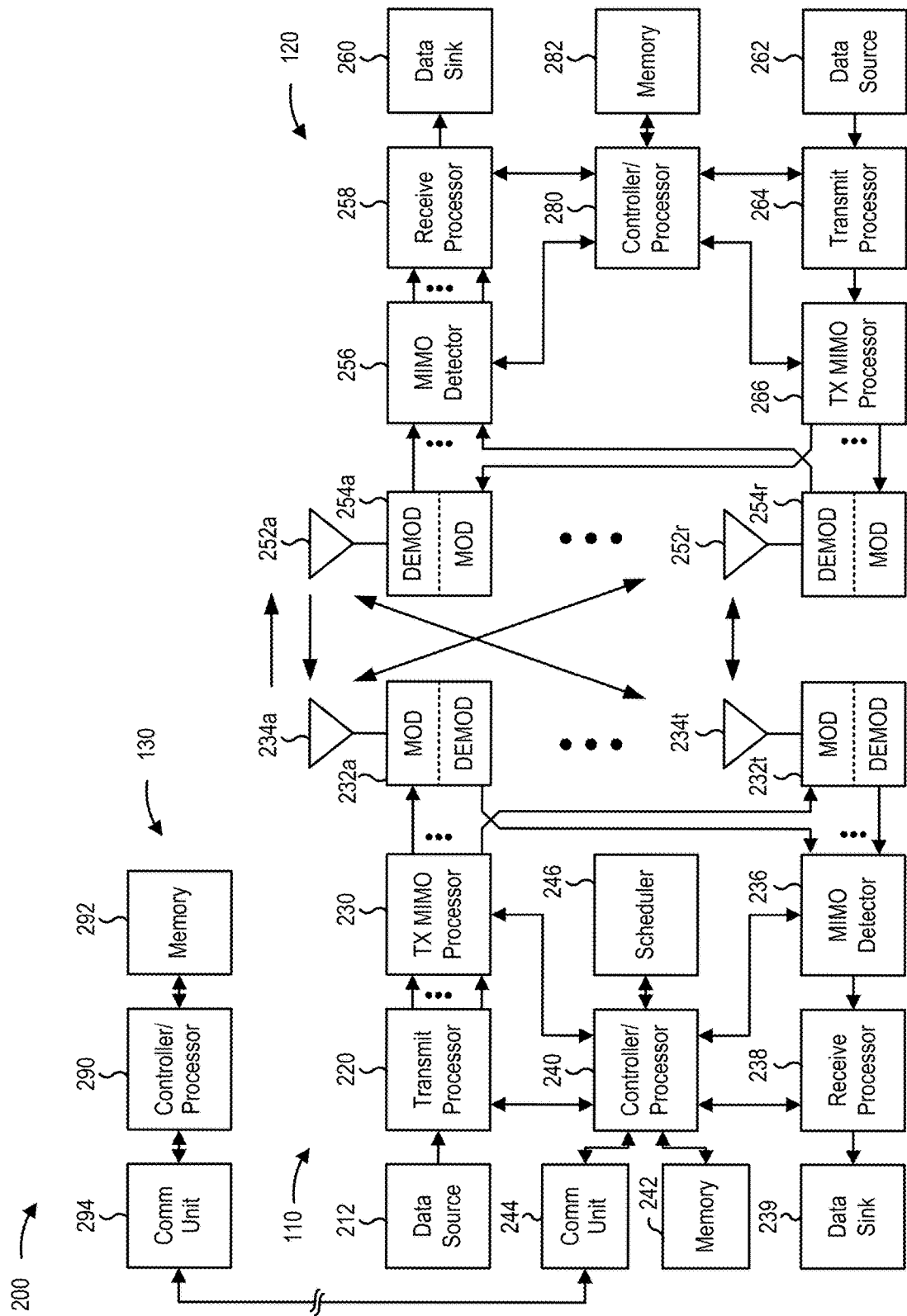
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects of the present disclosure, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254*a* through 254*r* (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 280 of the UE 120, and/or any other component(s) of FIG. 2 may perform one or more techniques associated with BWP aggregation, as described in more detail elsewhere. For example, the controller/processor 240 of the base station 110, the controller/processor 280 of the UE 120, and/or any other component(s) of FIG. 2 may perform or direct operations of, for example, the process of FIG. 9 and/or other processes as described. Memories 242 and 282 may store data and program codes for the base station 110 and UE 120, respectively. A scheduler 246 may schedule UEs for data transmission on the downlink and/or uplink.

In some aspects of the present disclosure, the UE 120 may include means for detecting, means for tuning, means for separating, means for receiving, means for rejecting, means for transmitting, and/or means for processing. Such means may include one or more components of the UE 120 described in connection with FIG. 2.

As indicated above, FIG. 2 is provided merely as an example. Other examples may differ from what is described with regard to FIG. 2.

The wireless device 120 may support NR carrier aggregation. NR carrier aggregation may also be referred to as multi-carrier operation. The wireless device 120 may be operated using a number of band groups, with each band group including a number of frequency bands (or simply, "bands"). For example, in some systems each band may cover up to 400 MHz and may include one or more carriers. For example, each carrier may cover up to 400 MHz in NR. Of course, the range for each of the bands is merely exemplary and not limiting, and other frequency ranges may be used. The wireless device 120 may be configured to support NR carrier aggregation, as shown in FIGS. 3A-3D.

FIGS. 3A-3D show four examples of NR carrier aggregation. Multiple NR carriers may be aggregated and transmitted in parallel to/from the same wireless device. Aggregation of carriers supports a wider bandwidth as well as higher per-link data rates. In operation, NR carriers are not specified as being contiguous in the frequency domain. As a result, NR carriers may be dispersed, both in the same frequency band as well as in different frequency bands, leading to various NR carrier aggregation scenarios, as shown in FIGS. 3A-3D.

Figure 3A:
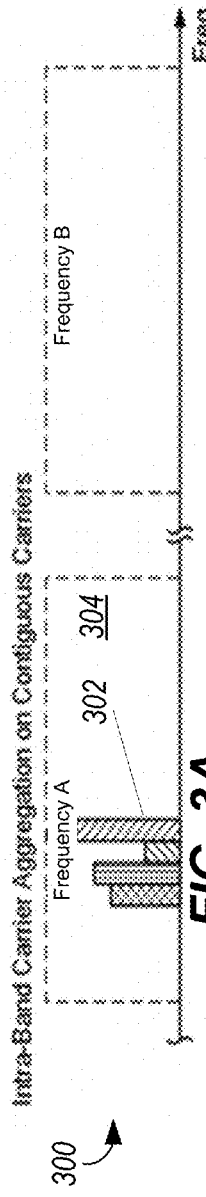
FIGS. 3A-3D show four examples of carrier aggregation.

FIG. 3A shows an example 300 of contiguous intra-band carrier aggregation (CCA). In the example 300 shown in FIG. 3A, a wireless device (e.g., the wireless device 120 of FIG. 1) is configured with four contiguous carriers 302 in the same band, which is within a frequency band A 304. The wireless device may send and/or receive transmissions on multiple contiguous carriers within the same band.

Figure 3B:
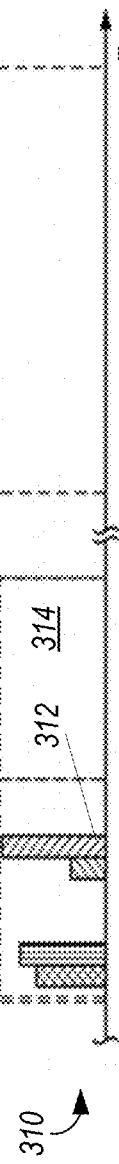

FIG. 3B shows an example 310 of non-contiguous intra-band carrier aggregation (NCCA) in a same band group. In the example 310 shown in FIG. 3B, a wireless device (e.g., the wireless device 120) is configured with four non-contiguous carriers 312 in the same band, within a low-band 314. The carriers may be separated by 5 MHz, 10 MHz, or some other amount. The wireless device may send and/or receive transmissions on multiple non-contiguous carriers within the same band.

Figure 3C:
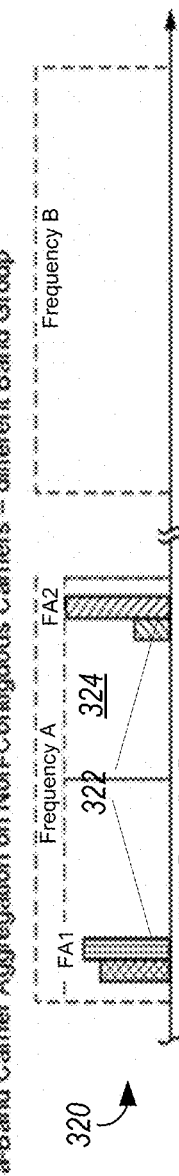

FIG. 3C shows an example 320 of non-contiguous intra-band carrier aggregation in a different band group. In the example 320 shown in FIG. 3C, a wireless device (e.g., the wireless device 120) is configured with four carriers 322 in two bands within the same band group, which is a low-band 324. The wireless device may send and/or receive transmissions on multiple carriers in different bands in the same band group (e.g., frequency band A1 (FA1) and frequency band A2 (FA2) in FIG. 3C).

Figure 3D:
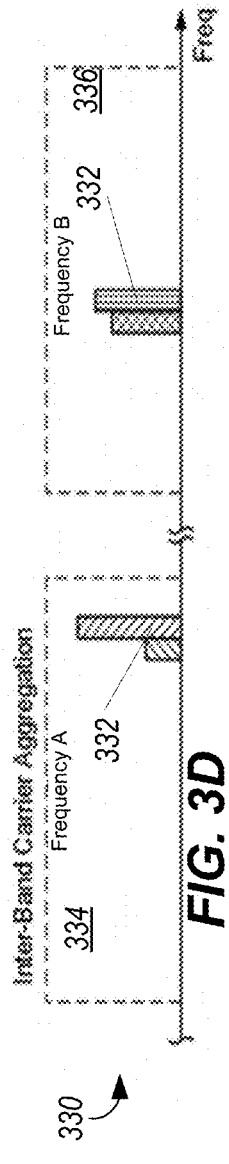

FIG. 3D shows an example of inter-band carrier aggregation. In the example 330 shown in FIG. 3D, a wireless device (e.g., the wireless device 120) is configured with four carriers 332 in two bands in different band groups, which include two carriers 332 in one band within a frequency band A 334 and two additional carriers 332 in another band within a frequency band B 336. The wireless device may send and/or receive transmissions on multiple carriers in different bands in different band groups (e.g., frequency band A and frequency band B in FIG. 3D).

FIGS. 3A to 3D show four examples 300-330 of carrier aggregation. Carrier aggregation may also be supported for other combinations of bands and band groups. In carrier aggregation architectures, blockers (e.g., jammers) limit performance of receive (Rx) circuitry. It is desirable for a wireless device to efficiently support carrier aggregation, which improves the receive (Rx) and transmit (Tx) circuitry.

Figure 4:
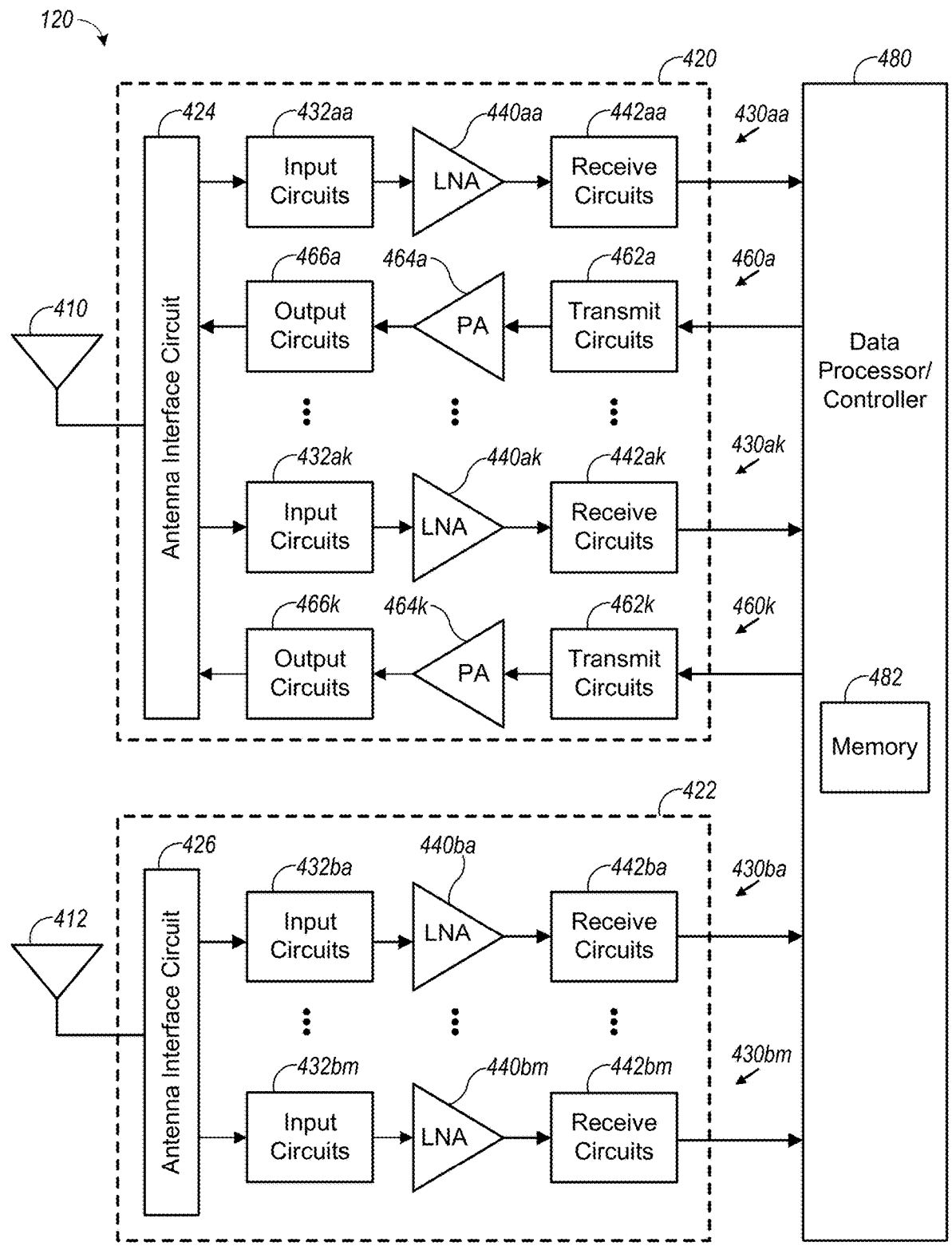
FIG. 4 is a block diagram of the wireless device in FIG. 1.

FIG. 4 is a block diagram of an exemplary design of components of the wireless device 120 in FIG. 1. In this exemplary design, the wireless device 120 includes a transceiver 420 coupled to an antenna 410 (e.g., a primary antenna), a receiver 422 coupled to a secondary antenna 412, and a data processor/controller 480. The transceiver 420 includes multiple (K) receivers (e.g., 430aa to 430ak) and multiple (K) transmitters (e.g., 460a to 460k) for supporting multiple bands, carrier aggregation, as well as multiple radio technologies. The receiver 422 includes multiple (M) receivers 430ba to 430bm for supporting multiple bands, carrier aggregation, multiple radio technologies, receive diversity, and multiple-input and multiple-output (MIMO) transmission from multiple transmit antennas to multiple receive antennas, etc.

In the exemplary design shown in FIG. 4, each of the receivers 430ba to 430bm includes input circuits 432aa to 432ak, low-noise amplifiers (LNAs) 440aa to 440ak, and receive circuits 442aa to 442ak. For data reception, the antenna 410 receives signals from base stations and/or other transmitter stations and provides a received radio frequency (RF) signal, which is routed through an antenna interface circuit 424 and provided to a selected receiver. The antenna interface circuit 424 may include switches, duplexers, transmit filters, receive filters, and the like. The description below assumes that the receiver 430aa is the selected receiver. Within the receiver 430aa, the received RF signal is passed through input circuits 432aa, which provide an input RF signal to an LNA 440aa. The input circuits 432aa may include a matching circuit, a receive filter, and the like. The LNA 440aa amplifies the input RF signal and provides an output RF signal. The receive circuits 442aa amplify, filter, and downconvert the output RF signal from RF to baseband and provide an analog input signal to a data processor/controller 480. The receive circuits 442aa may include mixers, filters, amplifiers, matching circuits, an oscillator, a local oscillator (LO) generator, a phase locked loop (PLL), and the like. Each remaining one of the receivers 430 in the transceiver 420 and each of the receivers 430 in the receiver 422 may operate in a similar manner as the receiver 430aa in the transceiver 420.

In the exemplary design shown in FIG. 4, each of the transmitters 460a to 460k includes transmit circuits 462a to 462k, power amplifiers (PAs) 464a to 464k, and output circuits 466a to 466k. For data transmission, the data processor/controller 480 processes (e.g., encodes and modulates) data to be transmitted and provides an analog output signal to a selected transmitter. The description below assumes that the transmitter 460a is the selected transmitter. Within the transmitter 460a, the transmit circuits 462a amplify, filter, and upconvert the analog output signal from baseband to RF for providing a modulated RF signal. The transmit circuits 462a may include amplifiers, filters, mixers, matching circuits, an oscillator, an LO generator, a PLL, and the like. A PA 464a receives and amplifies the modulated RF signal and provides a transmit RF signal having the proper output power level. The transmit RF signal is passed through output circuits 466a, routed through the antenna interface circuit 424, and transmitted via the antenna 410. The output circuits 466a may include a matching circuit, a transmit filter, a directional coupler, and the like.

FIG. 4 shows an exemplary design of the receivers 430aa to 430ak and the transmitters 460a to 460k. A receiver and a transmitter may also include other circuits not shown in FIG. 4, such as filters, matching circuits, etc. All or a portion of the transceiver 420 and the receiver 422 may be implemented on one or more analog radio frequency integrated circuits (RFICs), mixed-signal ICs, or other like analog circuits. For example, LNAs 440, receive circuits 442, and transmit circuits 462 may be implemented on one module, which may be an RFIC. Antenna interface circuits (e.g., 424 and 426), the input circuits 432, the output circuits 466, and the PAs 464 may be implemented on another module, which may be a hybrid module. The circuits in the transceiver 420 and the receiver 422 may also be implemented in other configurations.

The data processor/controller 480 may perform various functions for the wireless device 120. For example, the data processor/controller 480 may perform processing for data received via the receivers 430 and data being transmitted via the transmitters 460. The data processor/controller 480 may control the operation of antenna interface circuits (e.g., 424 and 426), input circuits 432, LNAs 440, receive circuits 442, transmit circuits 462, PAs 464, output circuits 466, or a combination thereof. A memory 482 may store program codes and data for the data processor/controller 480. The data processor/controller 480 may be implemented on one or more application-specific integrated circuits (ASICs) and/or other ICs.

The wireless device 120 may receive transmissions from one or more base stations/cells on multiple carriers at different frequencies for carrier aggregation. For example, the wireless device 120 may include a non-contiguous carrier aggregation (NCCA) architecture with phase locked loops (PLLs) and local oscillators (LOs).

For NR, in non-contiguous carrier aggregation (NCCA) scenarios, two paths share the LNAs 440. For example, undergoing a bandwidth part (BWP) switch across two downlink signal paths involves a switch to a lower bandwidth and operating at the lower bandwidth. In this example, two downlink pipes carry the in-phase/quadrature (I/Q) data. Unfortunately, when two carriers share the LNAs 440, according to the NCCA scenarios noted above, power is wasted because two signal paths and the shared LNAs 440 are operating.

Figure 5:
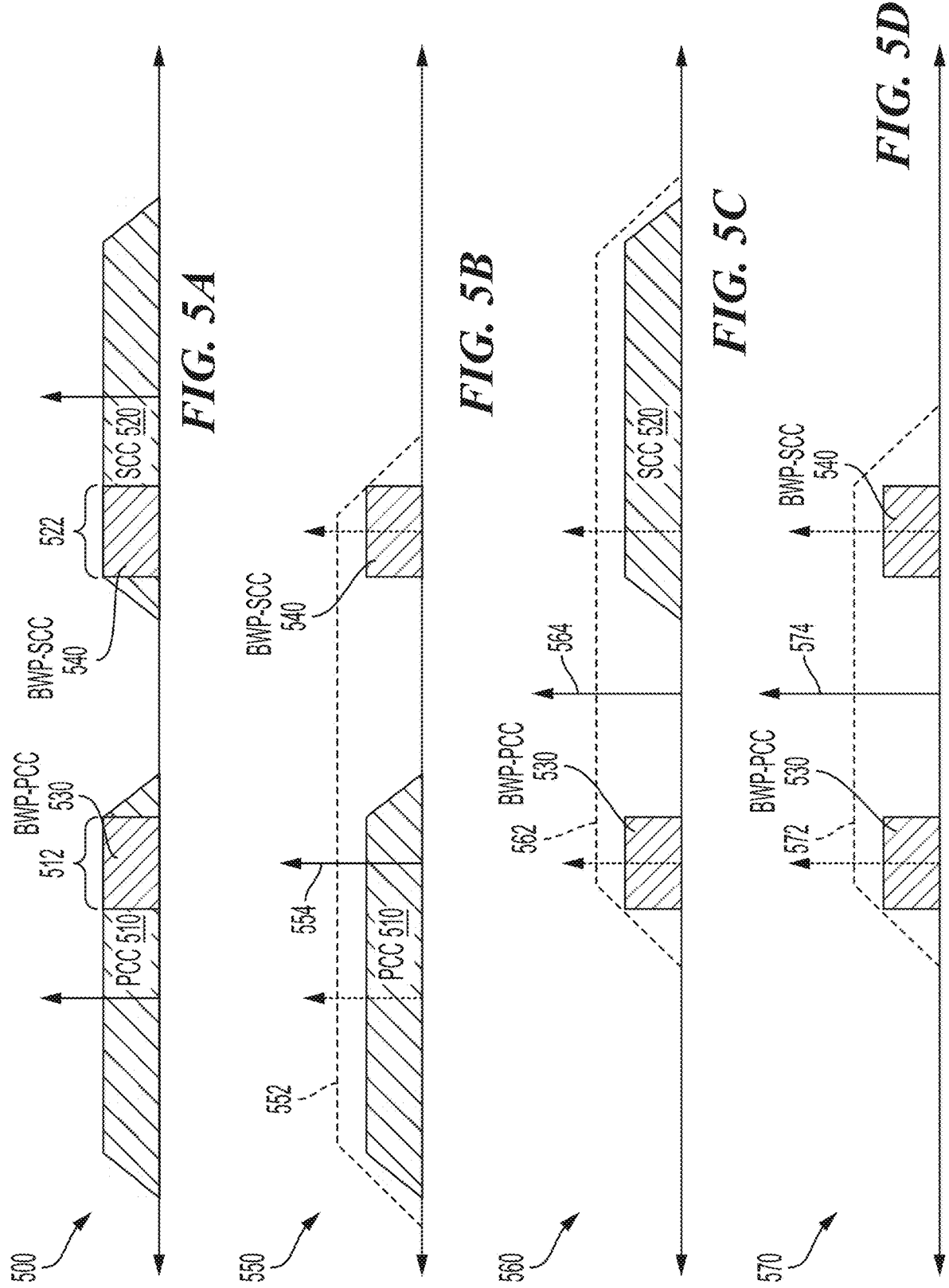
FIGS. 5A-5D are signal diagrams illustrating non-contiguous carrier aggregation scenarios in which two carriers may operate within a same band, according to aspects of the present disclosure.

FIGS. 5A-5D are signal diagrams illustrating non-contiguous carrier aggregation scenarios in which two carriers may operate within a same band, according to aspects of the present disclosure. As shown in FIG. 5A, a signal diagram 500 illustrates a primary component carrier (PCC) bandwidth part (BWP) 530 of a first carrier aggregation signal 510 (e.g., PCC). The signal diagram 500 also illustrates a secondary component carrier (SCC) bandwidth part (BWP) 540 of a second carrier aggregation signal 520 (e.g., SCC). Although described with reference to a primary component carrier and a secondary component carrier, it should be recognized that aspects of the present disclosure are not limited to the PCC BWP 530 and the SCC BWP 540 to enable application to other radio access technologies (RATs).

In this example, the first carrier aggregation signal 510 and the second carrier aggregation signal 520 both share the LNA 440 of FIG. 4. In addition, the PCC BWP 530 of the first carrier aggregation signal 510 occupies an upper edge 512 of a first channel bandwidth. By contrast, the SCC BWP 540 of the second carrier aggregation signal 520 occupies a lower edge 522 of a second channel bandwidth, and is within a nominal channel spacing of the PCC BWP 530. That is, the PCC BWP 530 of the first carrier aggregation signal 510 and the SCC BWP 540 of the second carrier aggregation signal 520 are each within a predetermined frequency range of each other. As a result, the proximity of the PCC BWP 530 and the SCC BWP 540 satisfies a continuous carrier aggregation (CCA) criteria for supporting the capability to operate in CCA mode. In some aspects of the present disclosure, the channel spacing of the PCC BWP 530 and the SCC BWP 540 may exceed the nominal channel spacing to enable the appearance of a gap jammer. In these aspects of the present disclosure, operation in the CCA mode is performed to reject the gap jammer using offset zero intermediate frequency (OZIF) processing.

FIG. 5B is a signal diagram 550 illustrating combining of the first carrier aggregation signal 510 and the SCC BWP 540 within a wideband channel 552, according to aspects of the present disclosure. In this example, the wideband channel 552 contains the first carrier aggregation signal 510 and the SCC BWP 540. A center frequency 554 of a single receiver (Rx) local oscillator (RxLO) is shown at the center of the wideband channel 552 to enable down conversion of the first carrier aggregation signal 510 and the SCC BWP 540.

FIG. 5C is a signal diagram 560 illustrating combining of the PCC BWP 530 and the second carrier aggregation signal 520 within a wideband channel 562, according to aspects of the present disclosure. In this example, the wideband channel 562 contains the PCC BWP 530 and the second carrier aggregation signal 520. A center frequency 564 of a single RxLO is shown near a center of the wideband channel 562 to enable down conversion of the PCC BWP 530 and the second carrier aggregation signal 520.

FIG. 5D is a signal diagram 570 illustrating combining of the PCC BWP 530 and the SCC BWP 540 within a wideband channel 572, according to aspects of the present disclosure. In this example, the wideband channel 572 contains the PCC BWP 530 and the SCC BWP 540. A center frequency 574 of a single RxLO is shown at near a center of the wideband channel 572 to enable down conversion of the PCC BWP 530 and the SCC BWP 540. In this example, a radio frequency (RF) channel of the wireless device 120 is tuned to the center of the wideband channel 572 including the first BWP (e.g., the PCC BWP 530) and the second BWP (e.g., the SCC BWP 540), as shown by the center frequency 574 of the single RxLO.

Figure 6:
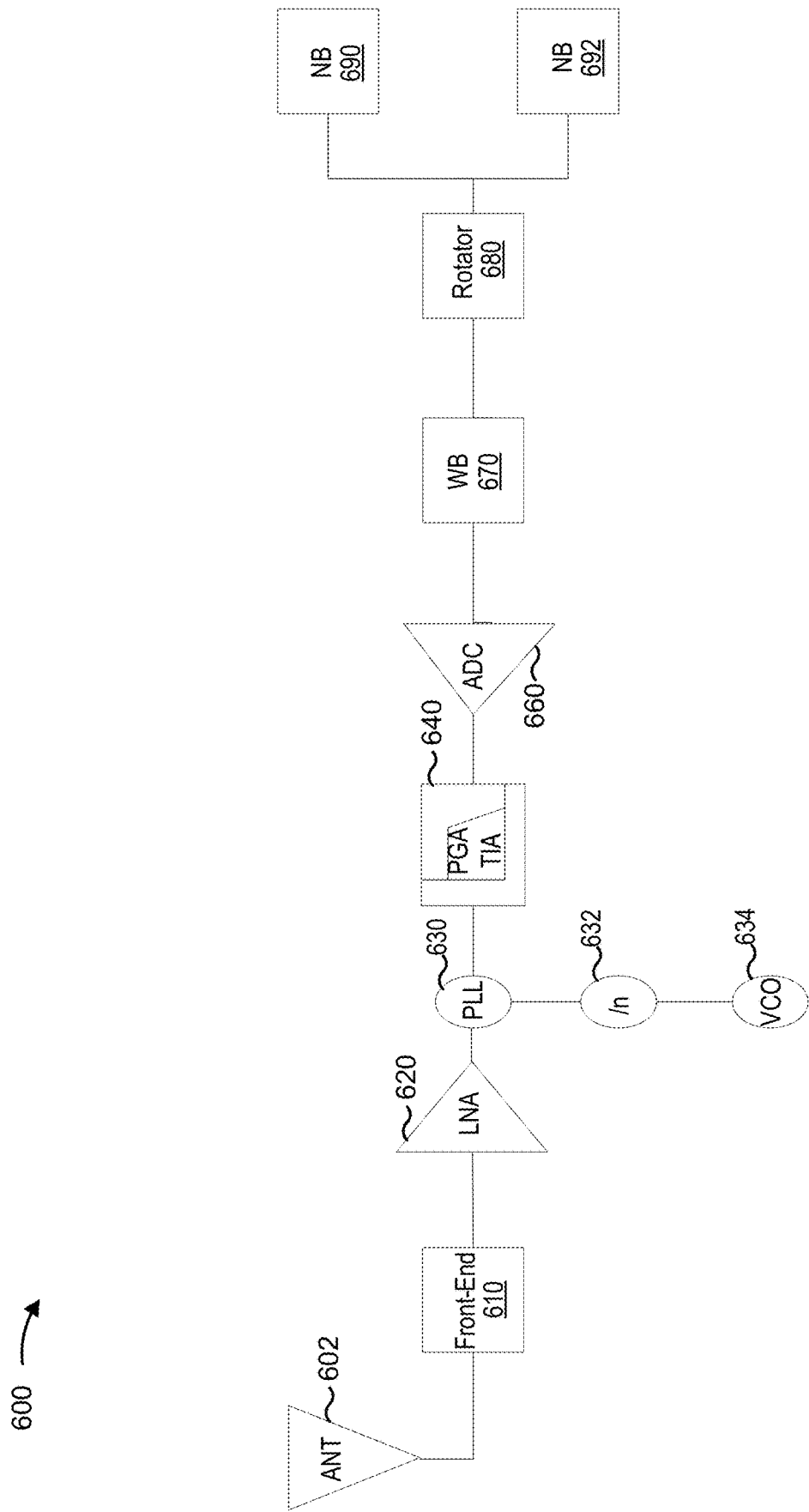
FIG. 6 is a block diagram illustrating a receiver (Rx) portion of a wireless transceiver (WTR) configured to combine bandwidth parts of separate carrier aggregation signals into a wideband channel, according to aspects of the present disclosure.

FIG. 6 is a block diagram illustrating a receiver (Rx) portion of a wireless transceiver (WTR) 600 that combines bandwidth parts of separate carrier aggregation signals into a wideband channel, according to aspects of the present disclosure. The WTR 600 supports a power saving scheme by processing separate carriers with a shared low noise amplifier (LNA) according to a continuous carrier aggregation (CCA) mode. This CCA mode combines the separate carriers into a wideband channel to enable processing of the wideband channel using a single receiver (SRx).

In one configuration, the WTR 600 includes an antenna 602 coupled to a radio frequency (RF) front-end 610 and a shared LNA 620. In this configuration, the separate carriers are combined into a wideband channel that is received by a single phase locked loop (PLL) 630, coupled to a divide by n (/n) stage 632 and a voltage controlled oscillator (VCO) 634. In this example, a downlink signal path is used to carry the data until a wideband (WB) stage 670. The downlink signal path includes a baseband post-post processing stage 640. The baseband post-processing stage 640 includes a programmable gain amplifier (PGA) and a trans-impedance amplifier (TIA). An output of the baseband post-processing stage 640 is provided to an analog-to-digital converter (ADC) stage 660.

In this configuration, the ADC stage 660 begins a digital stage of the WTR 600. In this example, a digital output of the ADC stage 660 is provided to the WB stage 670. An output of the WB stage 670 is provided to a rotator stage 680. Following the rotator stage 680, a first narrowband (NB) path 690 and a second NB path 692 of a software defined radio (SDR) carry data for the multiple carriers. Aspects of the present disclosure save the power of one PLL stage 630 and one SDR analog path (e.g., 610, 620, 630, 632, 634, and 640). In this aspect of the present disclosure, the first BWP (e.g., PCC BWP 530) of the first carrier aggregation signal 510 and the second BWP (e.g., the SCC BWP 540) of the second carrier aggregation signal 520 are separated at a narrow band level, after the rotator stage 680.

According to aspects of the present disclosure, a path of the WTR 600 processes the combined bandwidth of the PCC BWP 530 and the SCC BWP 540 as a single wideband channel, as shown in FIGS. 5B, 5C, or 5D. A wireless device 120 may determine whether to switch between a single receiver (SRx) mode and a single transmitter (STx) mode (e.g. SRx/STx). Switching between SRx/STx modes saves power by avoiding operating with two receiver phase locked loops (RxPLLs). Switching between SRx/STx modes achieves the same performance with a single RxPLL and a WTR wideband chain in a digital transceiver (DTR) stage of the wireless device 120.

FIGS. 7A-7D are signal diagrams illustrating non-contiguous carrier aggregation scenarios in which two carriers may operate within a same band that includes a gap jammer, according to aspects of the present disclosure. As shown in FIG. 7A, a signal diagram 700 illustrates a primary component carrier (PCC) bandwidth part (BWP) 730 of a first carrier aggregation signal 710 (e.g., PCC). A secondary component carrier (SCC) bandwidth part (BWP) 740 of a second carrier aggregation signal 720 (e.g., SCC) is also shown. Unfortunately, a gap jammer 750 is within a gap 702 between the first carrier aggregation signal 710 and the second carrier aggregation signal 720. That is, the channel spacing of two carriers exceeds the nominal channel spacing to enable an appearance of the gap jammer 750.

In this example, the first carrier aggregation signal 710 and the second carrier aggregation signal 720 both share the low noise amplifier (LNA) 440 of FIG. 4. In addition, the PCC BWP 730 of the first carrier aggregation signal 710 occupies an upper edge 712 of the channel bandwidth of the first carrier aggregation signal 710. By contrast, the SCC BWP 740 of the second carrier aggregation signal 720 occupies a lower edge 722 of the channel bandwidth of the second carrier aggregation signal 720. In contrast to FIGS. 5A-5D, the SCC BWP 740 is not within a nominal channel spacing of the PCC BWP 730. Nevertheless, FIGS. 7A-7D illustrate examples in which a single wideband channel is sufficient to carry an aggregated bandwidth of the PCC BWP 730 and the SCC BWP 740. Unfortunately, the gap jammer 750 is received in the gap 702 between the PCC BWP 730 and the SCC BWP 740 because a width of the gap 702 is greater than the nominal channel spacing.

FIG. 7B is a signal diagram 760 illustrating combining of the first carrier aggregation signal 710 and the SCC BWP 740 within a wideband channel 752, according to aspects of the present disclosure. A center frequency 754 of a single receiver (Rx) local oscillator (RxLO) is shown at the center of the wideband channel 752 for down conversion of the first carrier aggregation signal 710, and the SCC BWP 740. The single RxLO configured to the center of the wideband channel 752 is insufficient to downconvert the signals due to the gap jammer 750. According to aspects of the present disclosure, the wireless device 120 operates in a zero-offset intermediate frequency (OZIF) mode to reject the gap jammer 750.

FIG. 7C is a signal diagram 770 illustrating combining of the PCC BWP 730 and the second carrier aggregation signal 720 within a wideband channel 762, according to aspects of the present disclosure. A center frequency 764 of a single RxLO is shown near a center of the wideband channel 762 for down conversion of the PCC BWP 730 and the second carrier aggregation signal 720. The single RxLO tuned to the center of the wideband channel 762 is unable to effectively process the received signals due to the gap jammer 750. According to aspects of the present disclosure, the wireless device 120 operates in an OZIF mode to reject the gap jammer 750.

FIG. 7D is a signal diagram 780 illustrating combining of the PCC BWP 730 and the SCC BWP 740 within a wideband channel 772, according to aspects of the present disclosure. A center frequency 774 of a single RxLO is shown near a center of the wideband channel 772 for down conversion of the PCC BWP 730 and the SCC BWP 740. The single RxLO tuned to the center of the wideband channel 772 is unable to effectively process the received signals due to the gap jammer 750. According to aspects of the present disclosure, the wireless device 120 operates in the OZIF mode to reject the gap jammer 750 between the PCC BWP 730 and the SCC BWP 740.

Figure 8:
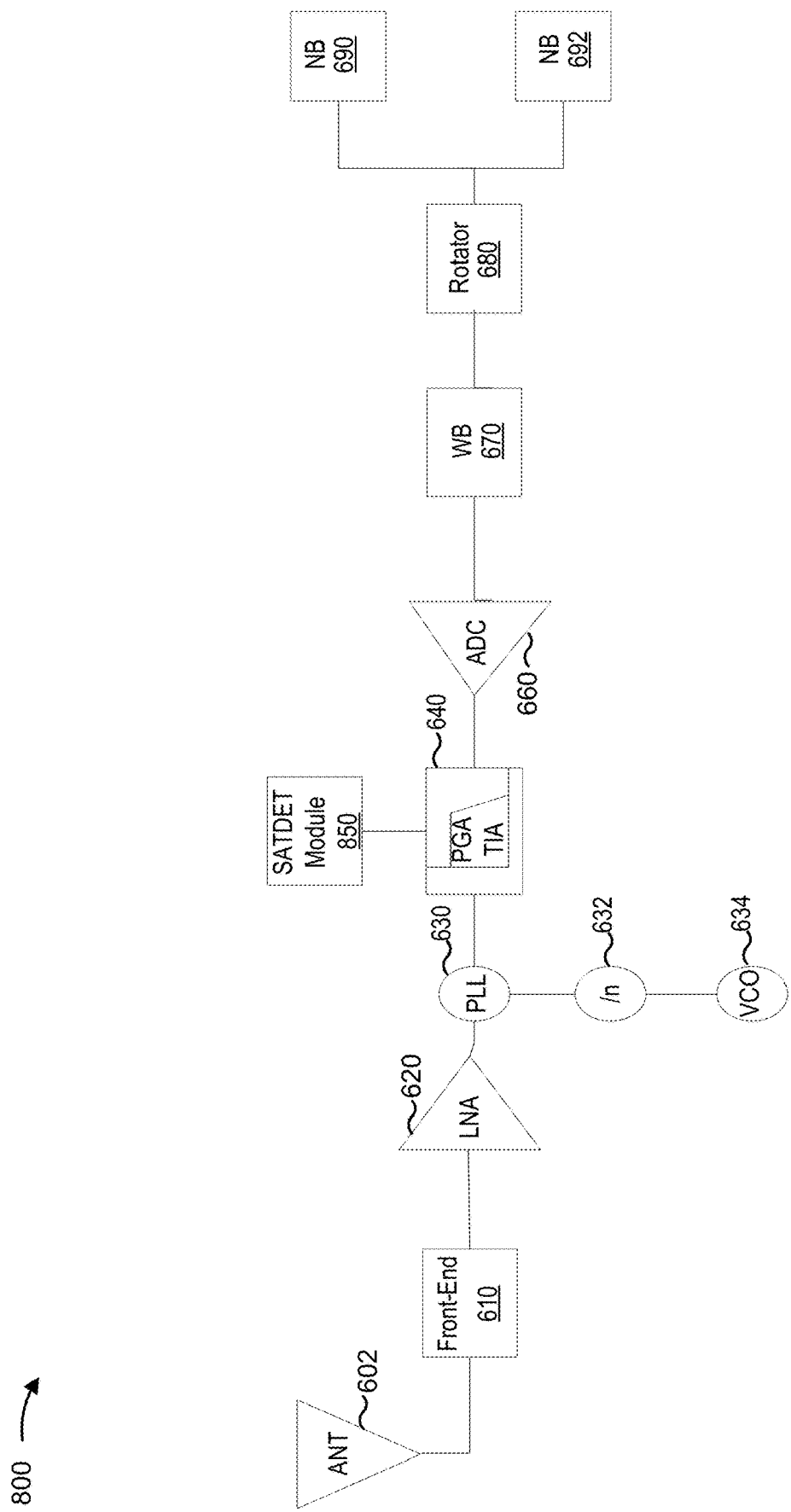
FIG. 8 is a block diagram illustrating a receiver (Rx) portion of a wireless transceiver (WTR) configured to combine bandwidth parts of separate carrier aggregation signals in a wideband channel in the presence of a gap jammer, according to aspects of the present disclosure.

FIG. 8 is a block diagram illustrating a receiver portion of a wireless transceiver (WTR) 800 configured to combine bandwidth parts of separate carrier aggregation signals into a wideband channel in the presence of a gap jammer, according to aspects of the present disclosure. The WTR 800 saves power by processing separate carriers with a shared low noise amplifier (LNA) according to the continuous carrier aggregation (CCA) mode. The WTR 800 may be configured similar to the WTR 600 of FIG. 6 and includes the same reference numbers for like elements.

In the configuration shown in FIG. 8, the WTR 800 includes a downlink signal path that carries the data until the wideband (WB) stage 670. The downlink signal path includes the baseband post-processing stage 640. The baseband post-post processing stage 640 includes a programmable gain amplifier (PGA) and a trans-impedance amplifier (TIA). An output of the baseband post-post processing stage 640 is provided to an analog-to-digital converter (ADC) stage 660. According to aspects of the present disclosure, a saturation detection (SATDET) module 850 is configured to identify gap jammers. In this aspect of the present disclosure, the WTR 800 operates in offset zero intermediate frequency (OZIF) processing mode to cancel the gap jammer for enabling combining of the two carriers through a single downlink pipe of the WTR 800. In this configuration, the baseband post-processing stage 640 includes a band pass filter (e.g., a biquad filter) in the analog path. In some aspects of the present disclosure, the channel spacing of two carriers exceeds the nominal channel spacing to enable appearance of a gap jammer. In this example, operation in CCA mode is performed to reject the gap jammer using the OZIF processing mode of the WTR 800.

As indicated above, FIGS. 3-8 are provided as examples. Other examples may differ from what is described with respect to FIGS. 3-8.

Figure 9:
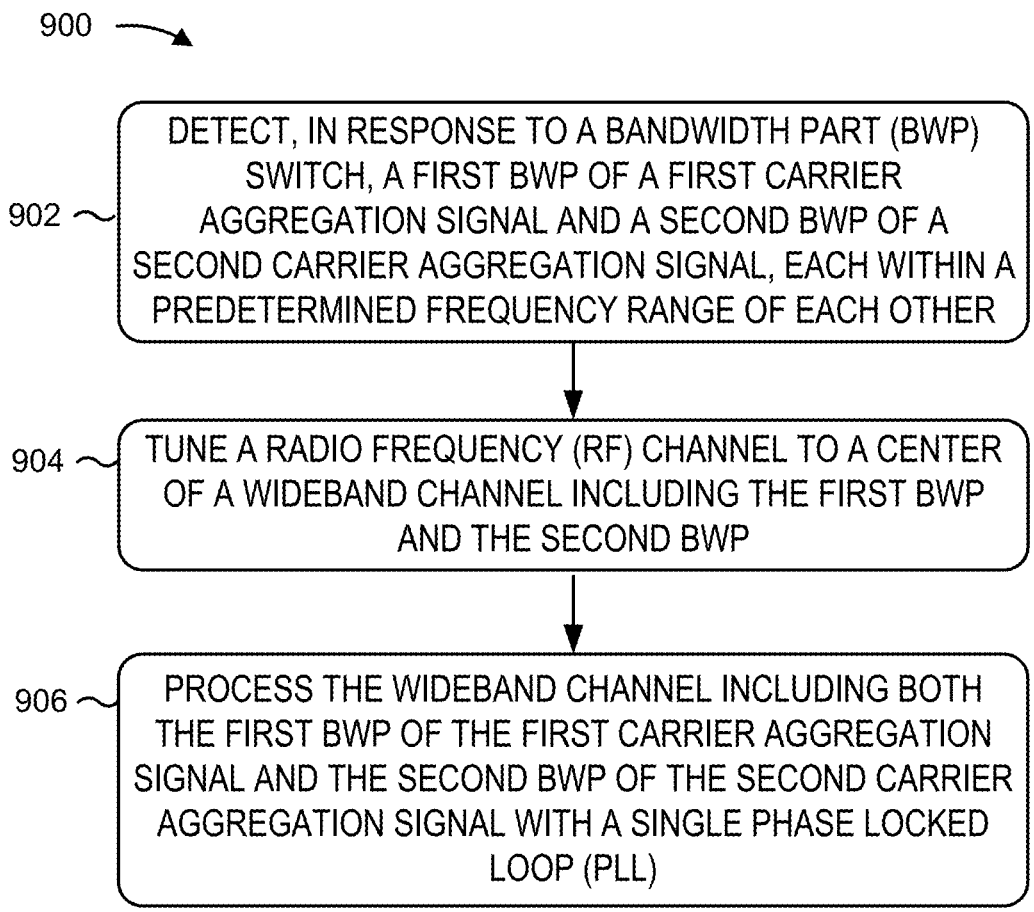
FIG. 9 is a diagram illustrating an example process to combine bandwidth parts of separate carrier aggregation signals into a wideband channel performed, for example, by a user equipment (UE), in accordance with various aspects of the present disclosure.

FIG. 9 is a diagram illustrating an example process 900 to combine bandwidth parts of separate carrier aggregation signals into a wideband channel performed, for example, by a user equipment (UE), in accordance with various aspects of the present disclosure. The example process 900 is an example of a 5G new radio (NR) UE enhancement to combine bandwidth parts of separate carrier aggregation signals into a wideband channel.

As shown in FIG. 9, in some aspects, the process 900 includes detecting, in response to a bandwidth part (BWP) switch, a first BWP of a first carrier aggregation signal and a second BWP of a second carrier aggregation signal, each within a predetermined frequency range of each other (block 902). For example, the UE (e.g., using the antenna 252, the DEMOD/MOD 254, the MIMO detector 256, the receive processor 258, the controller/processor 280, and/or the memory 282) can detect the first BWP of the first carrier aggregation signal and the second BWP of the second carrier aggregation signal, each within a predetermined frequency range of each other.

In some aspects, the process 900 further includes tuning a radio frequency (RF) channel to a center of a wideband channel including the first BWP and the second BWP (block 904). For example, the UE (e.g., using the antenna 252, the DEMOD/MOD 254, the MIMO detector 256, the receive processor 258, the controller/processor 280, and/or the memory 282) can tuning the RF channel to a center of the wideband channel including the first BWP and the second BWP. In some aspects, the process 900 further includes processing the wideband channel including both the first BWP of the first carrier aggregation signal and the second BWP of the second carrier aggregation signal with a single phase locked loop (PLL) (block 906). For example, the UE (e.g., using the DEMOD/MOD 254, the MIMO detector 256, the receive processor 258, the controller/processor 280, and/or the memory 282) can process the wideband channel including both the first BWP of the first carrier aggregation signal and the second BWP of the second carrier aggregation signal.

Implementation examples are described in the following numbered clauses:

1. A method of wireless communications by a user equipment (UE), comprising:
detecting, in response to a bandwidth part (BWP) switch, a first BWP of a first carrier aggregation signal and a second BWP of a second carrier aggregation signal, each within a predetermined frequency range of each other;
tuning a radio frequency (RF) channel to a center of a wideband channel including the first BWP and the second BWP; and
processing the wideband channel including both the first BWP of the first carrier aggregation signal and the second BWP of the second carrier aggregation signal with a single phase locked loop (PLL).

2. The method of clause 1, in which the predetermined frequency range equals a nominal channel spacing of a single receiver (SRx).

3. The method of any of clauses 1-2, further comprising:
detecting, using a saturation detection module, a jammer between the first BWP of the first carrier aggregation signal and the second BWP of the second carrier aggregation signal; and
rejecting the jammer with offset zero intermediate frequency (OZIF) processing.

4. The method of clause 3, in which the OZIF processing comprises attenuating the jammer with a biquad filter.

5. The method of any of clauses 1-3, in which the predetermined frequency range is greater than a nominal channel spacing and less than an upper bound.

6. The method of any of clauses 1-3 and 5, in which the upper bound is a function of a hardware processing capability of the UE.

7. The method of any of clauses 1-6, in which the processing comprises receiving both the first BWP of the first carrier aggregation signal and the second BWP of the second carrier aggregation signal with the single PLL.

8. The method of any of clauses 1-7, further comprising separating the first BWP of the first carrier aggregation signal and the second BWP of the second carrier aggregation signal at a narrow band level.

9. The method of any of clauses 1-8, in which the processing comprises transmitting both the first BWP of the first carrier aggregation signal and the second BWP of the second carrier aggregation signal with the single PLL.

10. The method of any of clauses 1-9, in which the first BWP of the first carrier aggregation signal occupies an upper edge of a first channel bandwidth and the second BWP of the second carrier aggregation signal occupies a lower edge of a second channel bandwidth.

11. The method of any of clauses 1-10, in which the first carrier aggregation signal and the second carrier aggregation signal are non-contiguous.

12. The method of any of clauses 1-10, in which the first BWP comprises a primary component carrier (PCC) BWP and the second BWP comprises a secondary component carrier (SCC) BWP.

13. An apparatus for wireless communications by a user equipment (UE), comprising:
means for detecting, in response to a bandwidth part (BWP) switch, a first BWP of a first carrier aggregation signal and a second BWP of a second carrier aggregation signal, each within a predetermined frequency range of each other;
means for tuning a radio frequency (RF) channel to a center of a wideband channel including the first BWP and the second BWP; and
means for processing the wideband channel including both the first BWP of the first carrier aggregation signal and the second BWP of the second carrier aggregation signal with a single phase locked loop (PLL).

14. The apparatus of clause 13, in which the predetermined frequency range equals a nominal channel spacing of a single receiver (SRx).

15. The apparatus of any of clauses 13-14, further comprising:
means for detecting, using a saturation detection module, a jammer between the first BWP of the first carrier aggregation signal and the second BWP of the second carrier aggregation signal; and
means for rejecting the jammer with offset zero intermediate frequency (OZIF) processing.

16. The apparatus of any of clauses 13-15, in which the means for processing comprises means for receiving both the first BWP of the first carrier aggregation signal and the second BWP of the second carrier aggregation signal with the single PLL.

17. The apparatus of any of clauses 13-16, further comprising means for separating the first BWP of the first carrier aggregation signal and the second BWP of the second carrier aggregation signal at a narrow band level.

18. The apparatus of any of clauses 13-17, in which the means for processing comprises means for transmitting both the first BWP of the first carrier aggregation signal and the second BWP of the second carrier aggregation signal with the single PLL.

19. The apparatus of any of clauses 13-18, in which the first BWP of the first carrier aggregation signal occupies an upper edge of a first channel bandwidth and the second BWP of the second carrier aggregation signal occupies a lower edge of a second channel bandwidth.

20. The apparatus of any of clauses 13-19, in which the first BWP comprises a primary component carrier (PCC) BWP and the second BWP comprises a secondary component carrier (SCC) BWP.

21. A user equipment (UE), comprising:
a processor;
a memory coupled with the processor; and
instructions stored in the memory and operable, when executed by the processor, to cause the UE:
to detect, in response to a bandwidth part (BWP) switch, a first BWP of a first carrier aggregation signal and a second BWP of a second carrier aggregation signal, each within a predetermined frequency range of each other;
to tune a radio frequency (RF) channel to a center of a wideband channel including the first BWP and the second BWP; and
to process the wideband channel including both the first BWP of the first carrier aggregation signal and the second BWP of the second carrier aggregation signal with a single phase locked loop (PLL).

22. The UE of clause 21, in which the predetermined frequency range equals a nominal channel spacing of a single receiver (SRx).

23. The UE of any of clauses 21-22, in which the instructions further cause the UE:
to detect, using a saturation detection module, a jammer between the first BWP of the first carrier aggregation signal and the second BWP of the second carrier aggregation signal; and
to reject the jammer with offset zero intermediate frequency (OZIF) processing.

24. The UE of any of clauses 21-23, in which the instruction to process further causes the UE to receive both the first BWP of the first carrier aggregation signal and the second BWP of the second carrier aggregation signal with the single PLL.

25. The UE of any of clauses 21-24, in which the instructions further cause the UE to separate the first BWP of the first carrier aggregation signal and the second BWP of the second carrier aggregation signal at a narrow band level.

26. The UE of any of clauses 21-25, in which the instruction to process further causes the UE to transmit both the first BWP of the first carrier aggregation signal and the second BWP of the second carrier aggregation signal with the single PLL.

27. The UE of any of clauses 21-26, in which the first BWP comprises a primary component carrier (PCC) BWP and the second BWP comprises a secondary component carrier (SCC) BWP.

28. A non-transitory computer-readable medium having program code recorded thereon, the program code executed by a processor and comprising:
program code to detect, in response to a bandwidth part (BWP) switch, a first BWP of a first carrier aggregation signal and a second BWP of a second carrier aggregation signal, each within a predetermined frequency range of each other;
program code to tune a radio frequency (RF) channel to a center of a wideband channel including the first BWP and the second BWP; and
program code to process the wideband channel including both the first BWP of the first carrier aggregation signal and the second BWP of the second carrier aggregation signal with a single phase locked loop (PLL).

29. The non-transitory computer-readable medium of clause 28, further comprising:

program code to detect, using a saturation detection module, a jammer between the first BWP of the first carrier aggregation signal and the second BWP of the second carrier aggregation signal; and program code to reject the jammer with offset zero intermediate frequency (OZIF) processing.

30. The non-transitory computer-readable medium of any of clauses 28-29, in which the first BWP comprises a primary component carrier (PCC) BWP and the second BWP comprises a secondary component carrier (SCC) BWP.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communications by a user equipment (UE), comprising:
    detecting, in response to a bandwidth part (BWP) switch, a first BWP of a first carrier aggregation signal and a second BWP of a second carrier aggregation signal, each within a predetermined frequency range of each other;
    tuning a radio frequency (RF) channel to a center of a wideband channel including the first BWP and the second BWP; and
    processing the wideband channel including both the first BWP of the first carrier aggregation signal and the second BWP of the second carrier aggregation signal with a single phase locked loop (PLL).

2. The method of claim 1, in which the predetermined frequency range equals a nominal channel spacing of a single receiver (SRx).

3. The method of claim 1, further comprising:
    detecting, using a saturation detection module, a jammer between the first BWP of the first carrier aggregation signal and the second BWP of the second carrier aggregation signal; and
    rejecting the jammer with offset zero intermediate frequency (OZIF) processing.

4. The method of claim 3, in which the OZIF processing comprises attenuating the jammer with a biquad filter.

5. The method of claim 3, in which the predetermined frequency range is greater than a nominal channel spacing and less than an upper bound.

6. The method of claim 5, in which the upper bound is a function of a hardware processing capability of the UE.

7. The method of claim 1, in which the processing comprises receiving both the first BWP of the first carrier aggregation signal and the second BWP of the second carrier aggregation signal with the single PLL.

8. The method of claim 7, further comprising separating the first BWP of the first carrier aggregation signal and the second BWP of the second carrier aggregation signal at a narrow band level.

9. The method of claim 1, in which the processing comprises transmitting both the first BWP of the first carrier aggregation signal and the second BWP of the second carrier aggregation signal with the single PLL.

10. The method of claim 1, in which the first BWP of the first carrier aggregation signal occupies an upper edge of a first channel bandwidth and the second BWP of the second carrier aggregation signal occupies a lower edge of a second channel bandwidth.

11. The method of claim 1, in which the first carrier aggregation signal and the second carrier aggregation signal are non-contiguous.

12. The method of claim 1, in which the first BWP comprises a primary component carrier (PCC) BWP and the second BWP comprises a secondary component carrier (SCC) BWP.

13. An apparatus for wireless communications by a user equipment (UE), comprising:
    means for detecting, in response to a bandwidth part (BWP) switch, a first BWP of a first carrier aggregation signal and a second BWP of a second carrier aggregation signal, each within a predetermined frequency range of each other;
    means for tuning a radio frequency (RF) channel to a center of a wideband channel including the first BWP and the second BWP; and
    means for processing the wideband channel including both the first BWP of the first carrier aggregation signal and the second BWP of the second carrier aggregation signal with a single phase locked loop (PLL).

14. The apparatus of claim 13, in which the predetermined frequency range equals a nominal channel spacing of a single receiver (SRx).

15. The apparatus of claim 13, further comprising:
means for detecting, using a saturation detection module, a jammer between the first BWP of the first carrier aggregation signal and the second BWP of the second carrier aggregation signal; and
means for rejecting the jammer with offset zero intermediate frequency (OZIF) processing.

16. The apparatus of claim 13, in which the means for processing comprises means for receiving both the first BWP of the first carrier aggregation signal and the second BWP of the second carrier aggregation signal with the single PLL.

17. The apparatus of claim 16, further comprising means for separating the first BWP of the first carrier aggregation signal and the second BWP of the second carrier aggregation signal at a narrow band level.

18. The apparatus of claim 13, in which the means for processing comprises means for transmitting both the first BWP of the first carrier aggregation signal and the second BWP of the second carrier aggregation signal with the single PLL.

19. The apparatus of claim 13, in which the first BWP of the first carrier aggregation signal occupies an upper edge of a first channel bandwidth and the second BWP of the second carrier aggregation signal occupies a lower edge of a second channel bandwidth.

20. The apparatus of claim 13, in which the first BWP comprises a primary component carrier (PCC) BWP and the second BWP comprises a secondary component carrier (SCC) BWP.

21. A user equipment (UE), comprising:
a processor;
a memory coupled with the processor; and
instructions stored in the memory and operable, when executed by the processor, to cause the UE:
to detect, in response to a bandwidth part (BWP) switch, a first BWP of a first carrier aggregation signal and a second BWP of a second carrier aggregation signal, each within a predetermined frequency range of each other;
to tune a radio frequency (RF) channel to a center of a wideband channel including the first BWP and the second BWP; and
to process the wideband channel including both the first BWP of the first carrier aggregation signal and the second BWP of the second carrier aggregation signal with a single phase locked loop (PLL).

22. The UE of claim 21, in which the predetermined frequency range equals a nominal channel spacing of a single receiver (SRx).

23. The UE of claim 21, in which the instructions further cause the UE:
to detect, using a saturation detection module, a jammer between the first BWP of the first carrier aggregation signal and the second BWP of the second carrier aggregation signal; and
to reject the jammer with offset zero intermediate frequency (OZIF) processing.

24. The UE of claim 21, in which the instruction to process further causes the UE to receive both the first BWP of the first carrier aggregation signal and the second BWP of the second carrier aggregation signal with the single PLL.

25. The UE of claim 24, in which the instructions further cause the UE to separate the first BWP of the first carrier aggregation signal and the second BWP of the second carrier aggregation signal at a narrow band level.

26. The UE of claim 21, in which the instruction to process further causes the UE to transmit both the first BWP of the first carrier aggregation signal and the second BWP of the second carrier aggregation signal with the single PLL.

27. The UE of claim 21, in which the first BWP comprises a primary component carrier (PCC) BWP and the second BWP comprises a secondary component carrier (SCC) BWP.

28. A non-transitory computer-readable medium having program code recorded thereon, the program code executed by a processor and comprising:
program code to detect, in response to a bandwidth part (BWP) switch, a first BWP of a first carrier aggregation signal and a second BWP of a second carrier aggregation signal, each within a predetermined frequency range of each other;
program code to tune a radio frequency (RF) channel to a center of a wideband channel including the first BWP and the second BWP; and
program code to process the wideband channel including both the first BWP of the first carrier aggregation signal and the second BWP of the second carrier aggregation signal with a single phase locked loop (PLL).

29. The non-transitory computer-readable medium of claim 28, further comprising:
program code to detect, using a saturation detection module, a jammer between the first BWP of the first carrier aggregation signal and the second BWP of the second carrier aggregation signal; and
program code to reject the jammer with offset zero intermediate frequency (OZIF) processing.

30. The non-transitory computer-readable medium of claim 28, in which the first BWP comprises a primary component carrier (PCC) BWP and the second BWP comprises a secondary component carrier (SCC) BWP.

* * * * *